Nov. 25, 1958    O. HACKER    2,861,642
SUSPENSION FOR TREAD SUPPORTING WHEELS OF
ENDLESS TREAD VEHICLES
Filed June 8, 1954
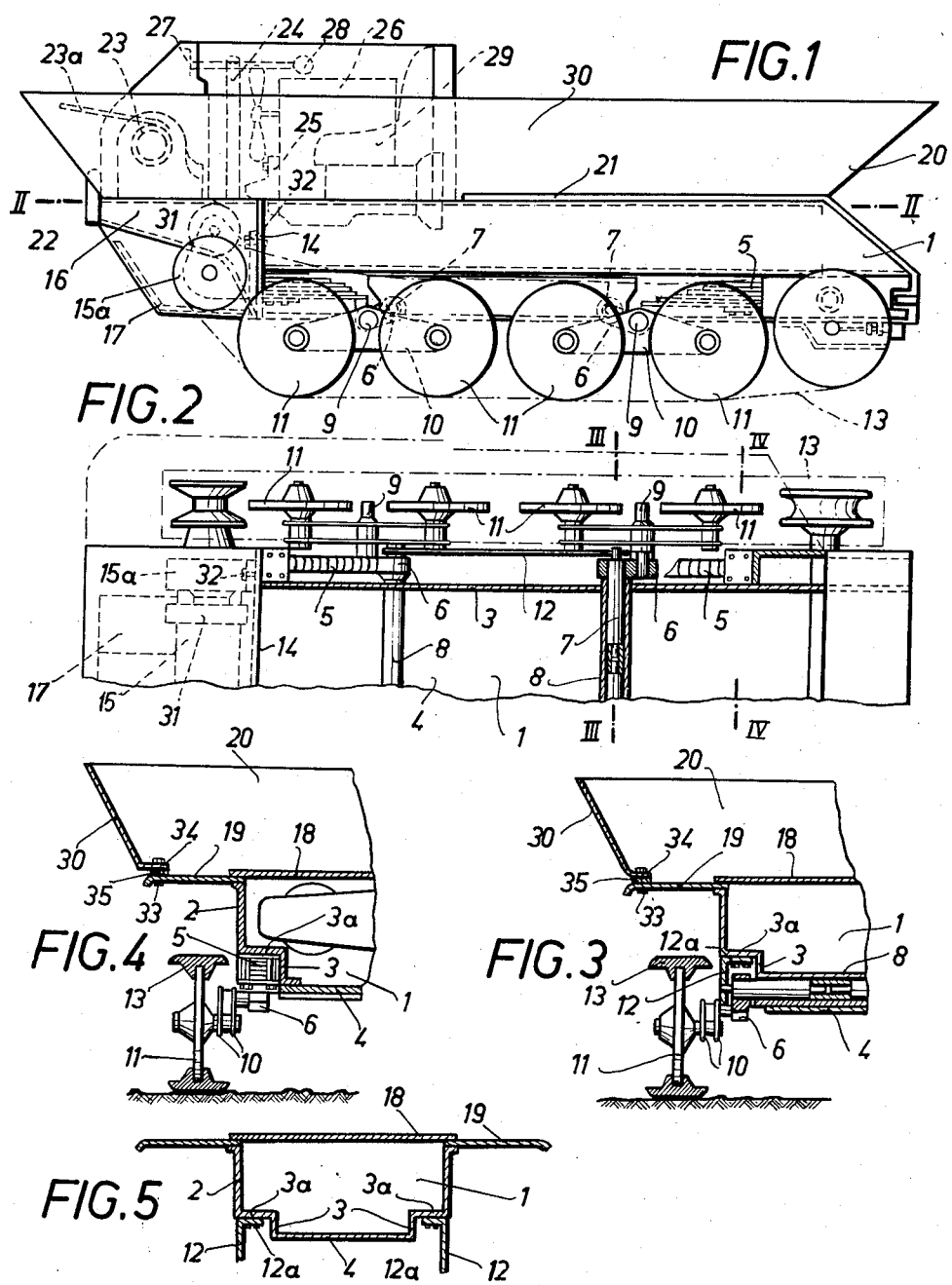

United States Patent Office

2,861,642
Patented Nov. 25, 1958

2,861,642

SUSPENSION FOR TREAD SUPPORTING WHEELS OF ENDLESS TREAD VEHICLES

Oskar Hacker, Vienna, Austria

Application June 8, 1954, Serial No. 435,267

Claims priority, application Austria June 17, 1953

3 Claims. (Cl. 180—9.1)

This invention relates to tracklaying vehicles, more particularly to tracklaying chassis and chassis frames.

When tracklaying vehicles such as tractors or the like are employed in marshy areas, especially in the tropics, the track chains often pick up plants, roots, earth etc. as they revolve, whereby an entire web of foreign matter often forms thereon. This foreign matter caught up tends to adhere to projecting parts of the running gear such as spring mountings, axle bearings, etc., and causes obstruction and eventual stoppage of the mechanism. When the soil is soft and yielding, the tracks sink deeply into the ground so that the bottom of the vehicle frame comes into contact with obstacles, e. g. tree stumps, or rests flat on the compressed soil so that the entire vehicle remains suspended and is incapable of further movement. Moreover, the tractors of previously known designs do not permit of a universal replacement of tracks to suit varying conditions of operation, such as snow, bog, road metal, road travel, etc., since the various tracks differ in gauge by reason of their link elements consisting of bolts, joints, rubber plates, and the like and for this reason would wipe along projecting parts of a suspension gear or axle guides intended for tracks of another gauge and type.

A general object of the present invention is to obviate or mitigate such disadvantages and to provide for tracklaying vehicles such as tractors a chassis which is suitable for mounting various implements and for the employment of tracks of widely varying types, as required, which eliminates obstructions and stoppages of the drive mechanism by foreign matter picked up by the tracks, which further prevents the vehicle from becoming suspended, i. e. incapable of further movement, in yielding marshy ground, and which permits movement through water to considerable depth even to the extent of imparting, if necessary, amphibious properties to the vehicle.

Further and more specific objects of the invention are:

To provide a tracklaying chassis in which the spring suspension means and the crank arms for the track rollers do not extend outwardly beyond the main portion of the side wall of the frame;

To provide a tracklaying chassis which provides means covering the crank arms and spring suspension means for the track rollers toward the outside while providing additional bearing support for the track roller axles;

To provide in a tracklaying chassis for an easily detachable mounting of the drive shaft and steering brakes in conjunction with a favorable arrangement of the engine, radiator and/or a winch.

To provide a watertight tracklaying chassis frame;

To provide a tracklaying chassis with means for protecting equipment mounted on the top of the frame from the lateral ingress of water.

These and other objects of the invention and its features set forth in the appended claims in distinguishing the invention from the prior art will become more apparent as the specification proceeds.

An illustrative embodiment of the invention will now be described with reference to the drawing, in which Fig. 1 shows in side elevation the chassis of a tracklaying tractor, Fig. 2 is a top plan view of the chassis, partly in a section taken along line II—II of Fig. 1, Fig. 3 is a detail sectional view taken on line III—III of Fig. 2, and Fig. 4 is a cross-sectional view taken on line IV—IV of Fig. 2.

Fig. 5 is a transverse sectional view of a tractor frame with cover plate, mudguards and stiffening members.

Referring now to the drawing, the chassis comprises a watertight frame 1 in the form of an open-topped trough. This trough has side walls whose main portions are indicated at 2 and which have along their lower edge a rebate or recess formed by an inner wall portion 3 and an upper wall portion 3a. The latter extends between the inner wall portion 3 and the main wall portion 2. These side walls are attached to a flat metal bottom 4. Leaf springs 5 are screwed to the frame 1 within the rebate 3, 3a and rest with their extremities on crank arms 6 to support the weight of the vehicle. The axles 7 carrying the crank arms 6 are rotatably mounted in transverse tubes 8 rigidly attached to the frame 1. The crank pins 9 are carried by the crank arms 6 and in turn carry rockers 10 mounting the track rollers 11. The side wall main portions 2 extend outwardly of the spring suspension means constituted by the leaf springs 5 and of the crank arms 6.

In order to strengthen the bearing arrangement of the crank arms 6, an angle section having a vertical flange 12 and a top flange 12a is disposed in the rebate 3 of the troughlike frame and provides bearings for the axles 7. The top flange 12a is affixed to the upper wall portion 3a and the vertical flange 12 extends downwardly from said top flange outwardly of said crank arms and spring suspension means 5. The angle section 12, 12a serves also to increase the moment of resistance of the sides 2, 3, 3a of the frame at its most heavily stressed part. The track 13 can move without obstruction past the smooth side walls of the frame 1 and of the angle section 12, 12a.

The track rollers 11 are carried by the crank arms 6 outwardly of the side wall main portions 2 and are laterally outwardly exposed throughout their height.

In its forward part of the troughlike frame 1 has a transverse wall 14, to which the drive shaft 15, carried in bearing housings 15a, with the steering brakes, is detachably secured. The bearing housings 15a are secured to the transverse wall 14 by bolts 32. The drawing also shows the brake drum 31 of a steering brake. The troughlike frame 1 is provided with extensions 16 beyond the transverse wall 14; these extensions are terminated by a stronger cross member to form a bracket, which provides a platform for mounting a winch comprising a winch casing 22, a drum 23 and a rope 23a; and a radiator 24. The platform also provides an engine support by carrying an engine bracket 25, to which the engine 26 is affixed. A cover 17 may be screwed to the lower part of the extensions 16 to extend below and in front of the drive shaft 15 and thus to protect the central portion of the drive shaft 15 and the steering brakes attached thereto from the ingress of water, mud, etc.

The top of the frame 1 may be sealed off by a plate 18 and carries mudguards 19. The cover plate 18 closes the entire top of the troughlike frame 1 to prevent the ingress of water into the same. In addition thereto a boatlike superstructure 20 may be mounted on the trough 1. The watertight superstructure may be detachably and watertightly connected to the trough 1. To this end the lower flange 34 of the superstructure 20 is screwed with bolts and nuts 33 to the cover plate 18 and the mudguards 19. The sidewalls 30 of the superstructure 20 are connected by the flange 34 to the mudguards 19 at points disposed laterally outwardly of the frame 1. The joint between the flange 34 and the mudguard 19 may be made watertight by an intervening gasket 35. The superstructure 20 will prevent the access of water to the power plant when the vehicle is moving in deep water or is actually afloat.

Behind the engine 26, radiator 24 winch 22—23a, a dashboard 27 and a control lever 28 representing a control station, and the driver's seat 29 a load platform 21 is left clear for the mounting of further implements or apparatus. That platform may also be surrounded by the boatlike superstructure 20.

In the construction provided by the invention no part of the suspension gear or crank arms or of other similarly placed elements projects outwardly or downwardly beyond the troughlike frame so that it is ensured that all foreign matter which may cling to the tracks will pass smoothly without involving obstruction or stoppage, and that any difficulties involved in a replacement of tracks, if necessary, are eliminated. The fact that the underside of the trough-like frame is not interrupted by projecting parts eliminates the possibility of the tractor remaining suspended, i. e. incapable of further movement, in marshy soil of low bearing strength.

The troughlike frame serves as a protection for the entire power plant and additional mechanical apparatus whilst at the same time enabling the vehicle to be employed at all points in marshy country. Movement through water is facilitated by the provision of the attachable boatlike superstructure; if necessary the vehicle may even be rendered amphibious. The additional boatlike superstructure surrounding the power plant and loading platform may simply be screwed to the cover plate and mudguards without any alteration of the frame or its attachments.

What I claim is:

1. In a tracklaying chassis which comprises track roller axle members carrying crank arms adjacent to their ends, a plurality of track rollers at least one of which is carried by each of said crank arms, and spring suspension means for said track rollers, the provision of a troughshaped frame mounting said axle members and having said spring suspension means attached thereto, which frame comprises a flat bottom and two side walls, each of said side walls having a main portion extending outwardly of said crank arms and spring suspension means, and a rebate extending along the lower edge of the side wall and formed by an inner wall portion extending inwardly of said crank arms and spring suspension means, and an upper wall portion extending above said crank arms and spring suspension means between said inner wall portion and main wall portion.

2. In a tracklaying chassis which comprises track roller axle members carrying crank arms adjacent to their ends extending beyond said crank arms, a plurality of track rollers at least one of which is carried by each of said crank arms, and spring suspension means for said track rollers, the combination of a troughshaped frame mounting said axle members and having said spring suspension means attached thereto, which frame comprises a flat bottom and two side walls, each of said side walls having a main portion extending outwardly of said crank arms and spring suspension means, and a rebate extending along the lower edge of the side wall and formed by an inner wall portion extending inwardly of said crank arms and spring suspension means and an upper wall portion extending above said crank arms and spring suspension means between said inner wall portion and main wall portion, and two angle sections each of which is arranged on one side of said frame and comprises a top flange affixed to said upper wall portion and a vertical flange extending downwardly from said top flange outwardly of said crank arms and spring suspension means, said vertical flange being provided with bearings supporting said axle member ends beyond said crank arms, and transverse tubes mounted in said frame and fitting around and supporting said axle members inwardly of said crank arms.

3. In a tracklaying chassis the combination of track roller axle members carrying crank arms adjacent to their ends, a plurality of track rollers at least one of which is carried by each of said crank arms, spring suspension means for said track rollers, and a troughshaped frame mounting said axle members and having said spring suspension means attached thereto, said frame comprising a flat bottom and two side walls, each of said side walls having a main portion extending outwardly of said crank arms and spring suspension means, and a rebate extending along the lower edge of the side wall and formed by an inner wall portion extending inwardly of said crank arms and spring suspension means, and an upper wall portion extending above said crank arms and spring suspension means between said inner wall portion and main wall portion, said track rollers being carried by said crank arms outwardly of said side wall main portions and being laterally outwardly exposed throughout their height.

References Cited in the file of this patent

UNITED STATES PATENTS

| | | |
|---|---|---|
| 560,798 | Fayette | May 26, 1896 |
| 1,332,067 | Rimailho | Feb. 24, 1920 |
| 1,345,326 | MacDonald | June 29, 1920 |
| 2,242,046 | Smalley | May 13, 1941 |
| 2,352,086 | Eberhard | June 20, 1944 |
| 2,361,800 | Thompson | Oct. 31, 1944 |
| 2,376,720 | Pflager | May 22, 1945 |
| 2,395,383 | White | Feb. 19, 1946 |
| 2,444,759 | Swennes | July 6, 1948 |
| 2,506,999 | La Rosa | May 9, 1950 |
| 2,538,600 | Swanson | Jan. 16, 1951 |
| 2,676,054 | Pasin | Apr. 20, 1954 |

FOREIGN PATENTS

| | | |
|---|---|---|
| 895,814 | France | Apr. 11, 1944 |
| 998,788 | France | Sept. 26, 1951 |
| 98,650 | Sweden | Apr. 16, 1940 |